United States Patent
Le et al.

(10) Patent No.: US 7,464,457 B2
(45) Date of Patent: *Dec. 16, 2008

(54) METHOD FOR FORMING A WRITE HEAD HAVING AN AIR BEARING SURFACE (ABS)

(75) Inventors: Quang Le, San Jose, CA (US); Edward Hin Pong Lee, San Jose, CA (US); Jui-Lung Li, San Jose, CA (US); Aron Peniek, San Jose, CA (US); Nian-Xiang Sun, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 134 days.

This patent is subject to a terminal disclaimer.

(21) Appl. No.: 11/469,132

(22) Filed: Aug. 31, 2006

(65) Prior Publication Data

US 2006/0288565 A1    Dec. 28, 2006

Related U.S. Application Data

(63) Continuation of application No. 10/672,896, filed on Sep. 26, 2003, now Pat. No. 7,120,988.

(51) Int. Cl.
*G11B 5/127* (2006.01)
*H04R 31/00* (2006.01)

(52) U.S. Cl. ............. 29/603.16; 29/603.12; 29/603.13; 29/603.15; 29/603.18; 205/119; 205/122; 216/62; 216/65; 216/66; 360/121; 360/122; 360/317; 451/5; 451/41

(58) Field of Classification Search ............. 29/603.07, 29/603.13–603.16, 603.18; 205/11, 122; 216/62, 66, 67; 360/122, 317; 451/5, 41
See application file for complete search history.

(56) References Cited

U.S. PATENT DOCUMENTS

| | | | | |
|---|---|---|---|---|
| 6,877,212 | B2* | 4/2005 | Okada et al. | 29/603.07 |
| 6,952,867 | B2* | 10/2005 | Sato | 29/603.15 |
| 7,120,988 | B2* | 10/2006 | Le et al. | 29/603.07 |

* cited by examiner

*Primary Examiner*—Paul D Kim
(74) *Attorney, Agent, or Firm*—Zilka-Kotab, PC

(57) ABSTRACT

Methods for forming write heads. One method includes forming a mask layer above a pole tip layer; forming a layer of resist above the mask layer; patterning the resist; removing portions of the mask layer not covered by the patterned resist; shaping a pole tip from the pole tip layer; depositing a layer of dielectric material above the pole tip and flux shaping layer, wherein the layer of dielectric material extends about adjacent to the mask layer; depositing a stop layer over the dielectric material, the stop layer abutting the mask layer; and polishing for forming a substantially planar upper surface comprising the mask layer and stop layer. Another method includes depositing a layer of dielectric material at least adjacent the pole tip, wherein the layer of dielectric material extends about adjacent to the mask layer. A further method includes forming dishing in the pole tip.

11 Claims, 9 Drawing Sheets

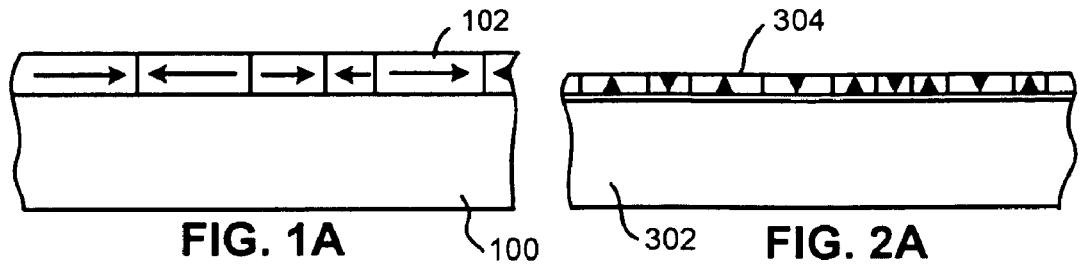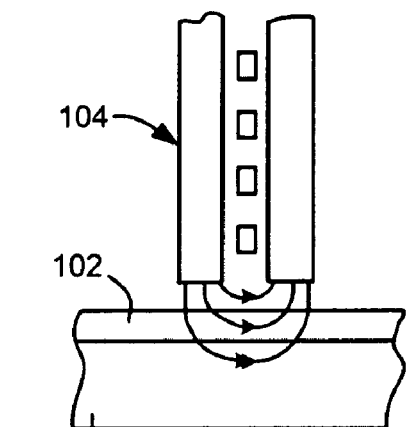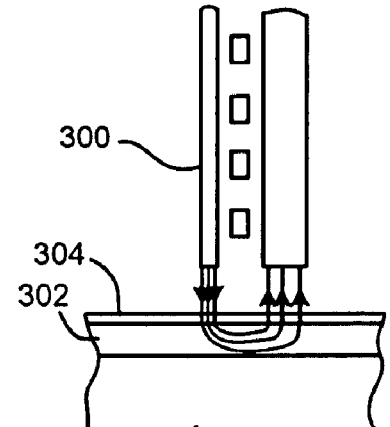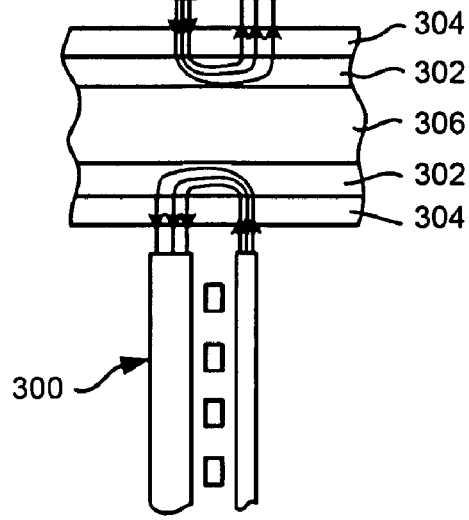
FIG. 1A (Prior Art)
FIG. 2A (Prior Art)
FIG. 1B (Prior Art)
FIG. 2B (Prior Art)
FIG. 2C (Prior Art)

METHOD FOR FORMING A WRITE HEAD HAVING AN AIR BEARING SURFACE (ABS)

RELATED APPLICATIONS

This application is a continuation of U.S. patent application Ser. No. 10/672,896, filed Sep. 26, 2003 now U.S. Pat. No. 7,120,988.

FIELD OF THE INVENTION

The present invention relates to magnetic heads, and more particularly, this invention relates to fabrication of a head having a trailing shield structure.

BACKGROUND OF THE INVENTION

In a typical head, an inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

FIG. 1A illustrates, schematically, a conventional recording medium such as used with conventional magnetic disc recording systems. This medium is utilized for recording magnetic impulses in or parallel to the plane of the medium itself. The recording medium, a recording disc in this instance, comprises basically a supporting substrate 100 of a suitable non-magnetic material such as glass, with an overlying coating 102 of a suitable and conventional magnetic layer.

FIG. 1B shows the operative relationship between a conventional recording/playback head 104, which may preferably be a thin film head, and a conventional recording medium, such as that of FIG. 1A.

As longitudinal recording is expected to reach its maximum at about ~140 Gbit/in$^2$ due to the supermagnetic effect, efforts have been focused on perpendicular recording to extend areal density.

FIG. 2A illustrates schematically the orientation of magnetic impulses substantially perpendicular to the surface of the recording medium. For such perpendicular recording the medium includes an under layer 302 of a material having a high magnetic permeability. This under layer 302 is then provided with an overlying coating 304 of magnetic material preferably having a high coercivity relative to the under layer 302.

Two embodiments of storage systems with perpendicular heads 300 are illustrated in FIGS. 2A and 2B (not drawn to scale). The recording medium illustrated in FIG. 2B includes both the high permeability under layer 302 and the overlying coating 304 of magnetic material described with respect to FIG. 2A above. However, both of these layers 302 and 304 are shown applied to a suitable substrate 306.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes magnetization substantially perpendicular to the surface of the medium. The flux is channeled by the soft underlying coating 302 back to the return layer (P1) of the head 300.

FIG. 2C illustrates a similar structure in which the substrate 306 carries the layers 302 and 304 on each of its two opposed sides, with suitable recording heads 300 positioned adjacent the outer surface of the magnetic coating 304 on each side of the medium.

One area of research in perpendicular head design is focused on developing a manufacturable fabrication process to form the write pole. Unlike longitudinal head design whereby the write pole aspect ratio is ~4:1, perpendicular write pole design requires a 2:1 aspect ratio and ~15 degree bevel to minimize adjacent track interference. As areal density approaches 120 Gb/in$^2$ or higher, the write pole's trackwidth scales down to 140 nm or lower. At these dimensions, write pole instability (reminiscent issues, e.g, writing continuing after power to head is terminated) becomes an issue and requires implementing lamination technology in the write pole. Lamination, however, forecloses use of plating to form the write pole.

In the fabrication aspect, factors such as HSU, shield thickness from the air bearing surface (ABS), and gap controls are important in achieving the angling effect of the effective write field. During fabrication, the gap must be tightly controlled in slider lapping, the shield thickness from the ABS must be precisely controlled. The parameters presented below must be considered to achieve optimal effective write field.

The constant demand for higher areal density has aggressively pushed for narrower trackwidth. Since the perpendicular write pole's aspect ratio is 2:1 and as the write pole trackwidth approaches ~102 nm for 200 Gbit/in$^2$ areal density, the thickness of the write pole will be about the thickness of a typical seed-layer. The difficulty in fabricating a trailing shield write pole is designing a process to have tight control of the write gap and fabricating a structure on top of the write gap with minimal damage to the write gap or write pole. Precise control of the gap thickness is important because if the gap is too thin, too much flux goes to the shield. If the gap is too thick, the flux angle into the media is not desirable, as the flux is most effective when entering the media at an angle (e.g., 45°) with respect to disk surface. Thus, the gap thickness must be near perfect.

The improvements of the single pole trailing shield (SPT) design of the invention over the single pole (SP) design can be explained by the Stoner-Wohlfarth model. FIG. 3 is a plot of H-grain angle as a function of the main grain angle. It can be seen that for a distribution of grain angles, increasing the angle between H and the mean grain angle can decrease the distribution of switching fields by ½ thus increasing the effective field by 2× and decreasing jitter.

FIG. 4 is a partial side view of a writer 400. The optimal field angle is achieved in the design when the distance (HSU) from the ABS to the soft underlayer of the media 402 is equal to the length of the write gap (GAP), which is the distance between the end of the trailing shield 404 and the write pole 406. The write field is decreased as the shield 404 is brought closer to the write pole piece 406 because part of the flux is increasingly shared between the soft underlayer of the media 402 and the trailing shield 404. This problem is ameliorated by controlling the thickness of the trailing shield 404. GAP, HSU, and bringing the flare point of the write pole closer to the ABS.

To get the optimized effective field angle, the gap and shield thickness need to be tightly control as shown in FIG. 5.

The benefits provided by such a design include:
1) Increased dH/dX
2) Reduced partial erasure
3) Improved saturation
4) Reduced media noise
5) Tilt field eases writing on S-W media.

In the past, damascene and image transfer technologies (DITT) were considered as methods to form the 15 degree beveled 2:1 aspect ratio of the write pole. However, due to the need to implement lamination to reduce write instability these technologies were found to be undesirable.

Ion milling is emerging an alternative approach to DITT to fabricate laminated write poles, but is not directly extendable to a trailing shield write pole design whereby the gap thickness between the write pole and shield (trailing shield) is tightly controlled.

Moreover at submicron trackwidth dimension, the pole piece as fabricated by ion milling will be fragile and removal of redeposited material on top (redeposition) and sides (fencing) of the pole will be increasingly more difficult.

What is needed is an effective and reliable way to fabricate a laminated write pole and write gap of a precise thickness for use in a perpendicular recording head.

The present invention introduces a method and materials to fabricate a trailing shield write pole that resolve the problems of controlling the write gap and preventing damage to the write gap or pole during fabrication of the subsequent structure. This process also introduces a CMP assisted lift-off process to remove redeposition and fencing (to increase yields) and a method to create curvature in the write pole.

SUMMARY OF THE INVENTION method for forming a write head having an air bearing surface (ABS) according to one embodiment includes forming a mask layer above a pole tip layer, forming a layer of resist above the mask layer; patterning the resist, the patterned resist defining about a maximum width of a pole tip in a direction parallel to the ABS of the head; removing portions of the mask layer not covered by the patterned resist; shaping a pole tip from the pole tip layer; depositing a layer of dielectric material above the pole tip and flux shaping layer, wherein the layer of dielectric material extends about adjacent to the mask layer; depositing a stop layer over the dielectric material, the stop layer abutting the mask layer, and polishing for forming a substantial planar upper surface comprising the mask layer and stop layer.

A method for forming a white head having an air bearing surface (ABS) according to another embodiment includes shaping a tapered pole tip from a pole tip layer, a mask layer being formed above the pole tip layer, depositing a layer of dielectric material at least adjacent the pole tip, wherein the layer of dielectric material extends about adjacent to the mask layer; and forming a gap layer above the pole tip to a desired thickness.

A method for forming a write head having an air bearing surface (ABS) according to yet another embodiment includes forming a pole tip layer, a mask layer being formed above the pole tip layer; shaping a pole tip from the pole tip layer; removing the mask layer; forming dishing in the pole tip; forming a gap layer above the pole tip to a desired thickness; and forming a trailing shield above the gap layer.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention as well as the preferred mode of use, reference should be made to the following detailed description read in conjunction with the accompanying drawings.

FIG. 1A is a schematic representation in section of a recording medium utilizing a longitudinal recording format.

FIG. 1B is a schematic representation of a conventional magnetic recording head and recording medium combination for longitudinal recording as in FIG. 1A.

FIG. 2A is a magnetic recording medium utilizing a perpendicular recording format.

FIG. 2B is a schematic representation of a recording head and recording medium combination for perpendicular recording on one side.

FIG. 2C is a schematic representation of the recording apparatus of the present invention, similar to that of FIG. 2B, but adapted for recording separately on both sides of the medium.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 6:
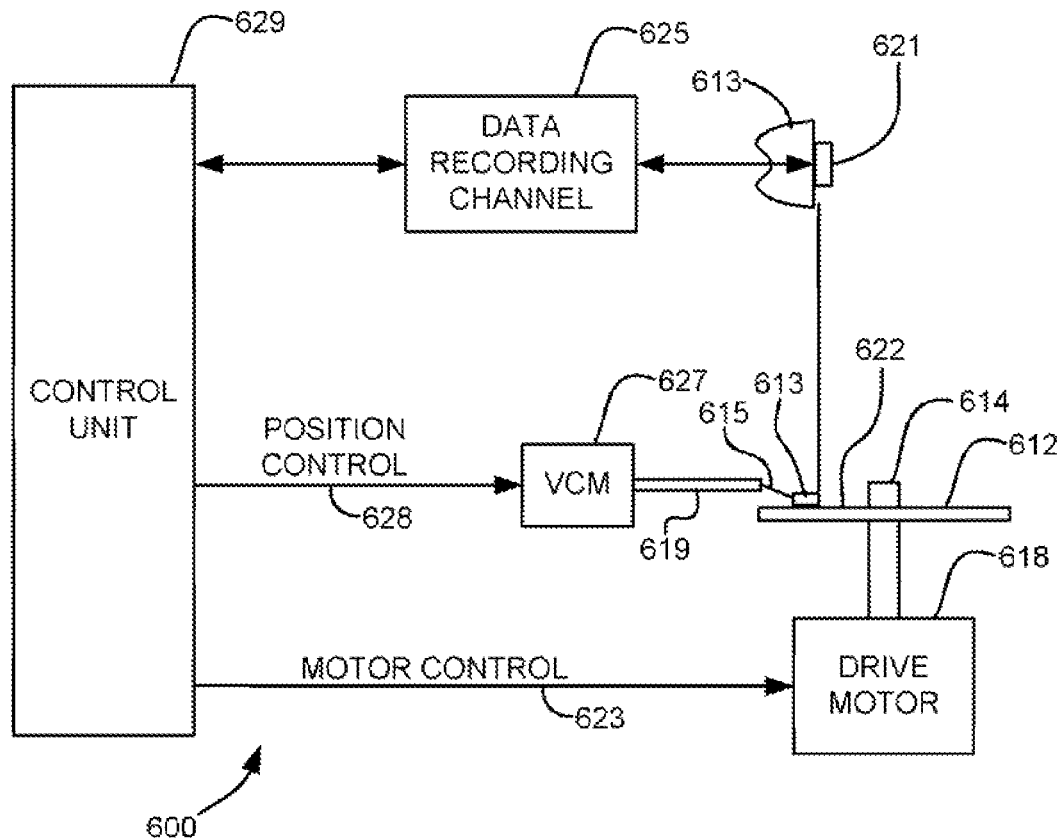
FIG. 6 is a simplified drawing of a magnetic recording disk drive system.

Referring now to FIG. 6 there is shown a disk drive 600 embodying the present invention. As shown in FIG. 6, at least one rotatable magnetic disk 612 is supported on a spindle 614 and rotated by a disk drive motor 618. The magnetic recording on each disk is in the form of an annular pattern of concentric data tracks (not shown) on the disk 612.

Figure 3:
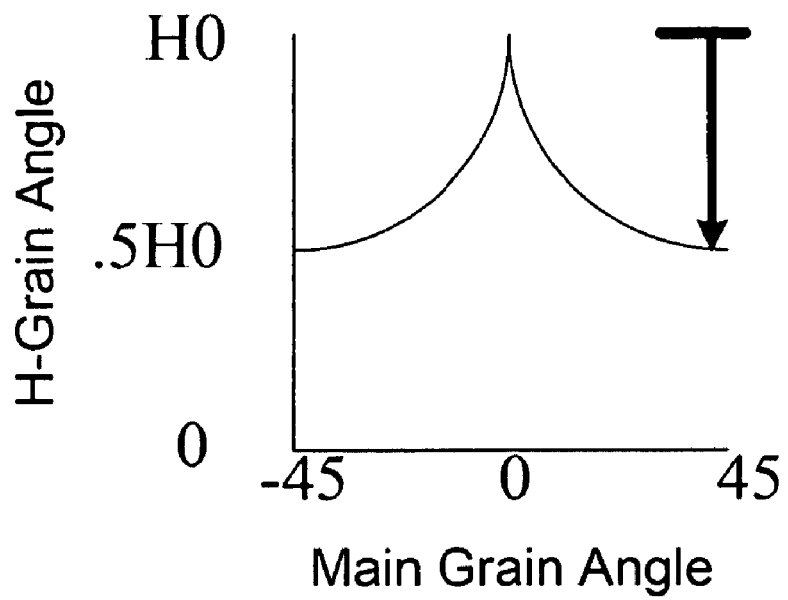
FIG. 3 is a plot of H-grain angle as a function of the main grain angle.
Figure 4:
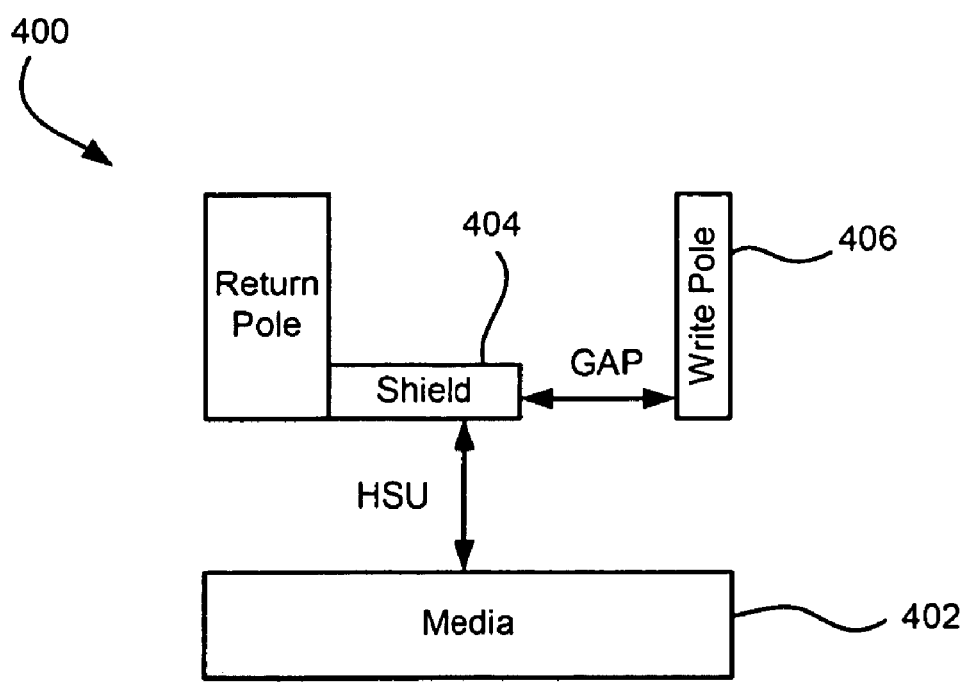
FIG. 4 is a partial side view of a writer.
Figure 5:
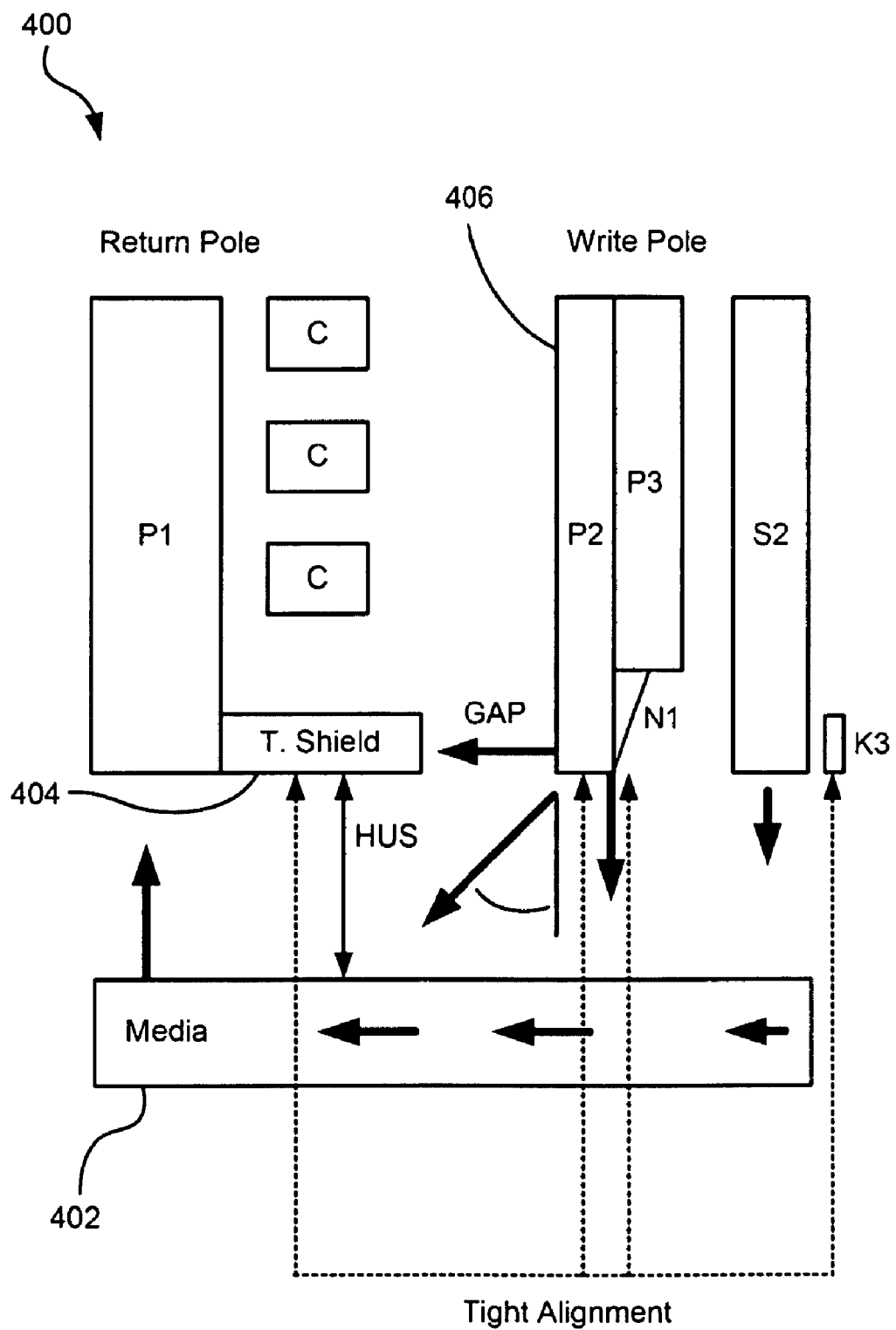
FIG. 5 is a partial side view of a writer.

At least one slider 613 is positioned near the disk 612, each slider 613 supporting one or more magnetic read/write heads 621. More information regarding such heads 621 will be set forth hereinafter during reference to the remaining FIGS. As the disks rotate, slider 613 is moved radially in and out over disk surface 622 so that heads 621 may access different tracks of the disk where desired data are recorded. Each slider 613 is attached to an actuator arm 619 by way of a suspension 615. The suspension 615 provides a slight spring force which biases slider 613 against the disk surface 622. Each actuator arm 619 is attached to an actuator means 627. The actuator means 627 as shown in FIG. 3 may be a voice coil motor (VCM). The VCM comprises a coil movable within a fixed magnetic field, the direction and speed of the coil movements being controlled by the motor current signals supplied by controller 629.

During operation of the disk storage system the rotation of disk 612 generates an air bearing between slide 613 and disk surface 622 which exerts an upward force or lift on the slider. The air bearing thus counter-balances the slight spring force of suspension 615 and supports slider 613 off and slightly above the disk surface by a small, substantially constant spacing during normal operation.

The various components of the disk storage system are controlled in operation by control signals generated by control unit 629, such as access control signals and internal clock signals. Typically, control unit 629 comprises logic control circuits, storage means and a microprocessor. The control unit 629 generates control signals to control various system operations such as drive motor control signals on line 623 and head position and seek control signals on line 628. The control signals on line 628 provide the desired current profiles to optimally move and position slider 613 to the desired data track on disk 612. Read and write signals are communicated to and from read/write heads 621 by way of recording channel 625.

The above description of a typical magnetic disk storage system and the accompanying illustration of FIG. 6 are for representation purposes only. It should be apparent that disk storage systems may contain a layer number of disks and actuators, and each actuator may support a number of sliders.

Figure 7:
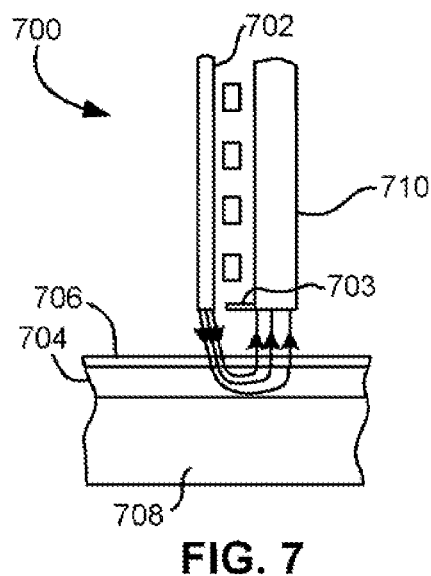
FIG. 7 is a simplified schematic representation of the improved recording apparatus of the present invention illustrating a recording head and recording medium combination for perpendicular recording on one side.

FIG. 7 illustrates schematically the orientation of magnetic impulses off-normal to an imaginary plane oriented perpendicular to the surface of the recording medium, generally in the manner provided for by the present invention. It is advantageous to write transitions to the media at an off-normal axis produces more stable domains in the media, as described in N. H. Yeh, J. Magn. Soc. Jpn, v. 21, p. 269 (1997), which is herein incorporated by reference. The off-normal flux is created by the combination of a pole 702 and a trailing shield 703.

Similar to the structure recited above with respect to FIG. 3, the medium includes an under layer 704 of a material having a high magnetic permeability, preferably greater than 100, such as a permalloy material. This under layer 704 is then provided with an overlying coating 706 which contains a magnetic material preferably having a coercivity substantially greater than the under layer 704. Both of these layers 704 and 706 are shown applied to a suitable substrate 708, which may desirably be an alumnum alloy disc, although other material such as glass may also be used.

Magnetic lines of flux extending between the poles 702, 710 of the recording head 700 loop into and out of the outer surface of the recording medium coating 706 with the high permeability under layer 704 of the recording medium causing the lines of flux to pass through the coating 706 in a direction at an angle to an imaginary plane perpendicular to the surface of the medium to record information in the magnetically hard coating 706 of the medium in the form of magnetic impulses having their axes of magnetization generally perpendicular to the surface of the medium. The flux is channeled by the soft underlying coating 704 back to the return layer (P1) 710 of the head 700.

As mentioned above, the need for higher areal density has aggressively pushed for narrower trackwidth. Since the perpendicular write pole tip's aspect ratio is about 2:1 and as the pole size approaches ~102 nm for 200 Gbit/in$^2$ areal density, the thickness of the write pole tip will be about the thickness of a typical seed-layer. The difficulty in fabricating a trailing shield write pole tip is designing a process to have right control of the write gap and fabricating a structure on top of the write gap with minimal damage to the write gap or write pole tip.

The present invention introduces a method and materials to fabricate a trailing shield write pole structure that resolve the problems of controlling the write gap and preventing damages to the write gap or pole during fabrication of the subsequent structure. This process also introduces CMP assisted lift-off process to remove re-deposition and fencing (increase yields) and a method to create curvature write pole. Moreover, also included in this disclosure are suitable materials that can function as an ion mill transfer layer, CMP layer, and RIEable layer. Note that the processes described herein are equally applicable to fabrication of single pole designs without trailing shields as well.

One approach to fabricate the trailing shield write pole is to use a highly mill-resistant transfer layer to protect the trailing edge structure definition (TED) during milling that can also function as a CMP stop layer after alumna deposition to remove redeposition and fencing and later be removed clearly by reactive ion etching (RIE) to deposit the write gap and form the trailing shield.

FIGS. 8A-8I together illustrate a process for forming a trailing shield write pole structure for a perpendicular head.

Figure 8A:
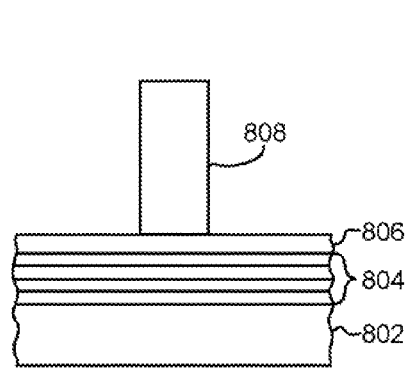
FIGS. 8A-8I depict a process for forming a trailing shield write pole structure for a perpendicular head according to one embodiment.

FIG. 8A illustrates an ABS view of a flux shaping layer 802 and a laminated pole tip layer 804 formed full film on top of the flux shaping layer 802. The flux shaping layer 802 carries flux to the pole tip. The flux shaping layer 802 is recessed from the ABS so that it does not write to the media.

The flux shaping layer 802 is formed of a magnetic material such as $Ni_{45}Fe_{55}$, etc. The pole tip layer 804 is preferably a lamination of layers of magnetic (e.g., CoFe, $Ni_{22}Fe_{78}$, FlFeN, CoFe/NiFe, etc.) and nonmagnetic (e.g., Rh, Ru, Cr or other metal as well as nonconductive materials) layers. Because the pole tip layer 804 is laminated, it is will have to be milled (dry process) as it would be hard or impossible to plate a laminated stack, though the present invention does not foreclose this possibility.

With continued reference to FIG. 8A, a mask layer 806 is formed above the pole tip layer 804. The mask layer 806 is formed of any RIEable material that is resistant to milling.

Preferred materials from which the mask layer 806 can be formed include carbon, silicon nitrates (e.g. $Si_3N_4$) tantalum oxides (e.g., $Ta_2O_5$), silicon oxides (e.g $SiO_2$), durimide, etc. and combinations thereof. The most preferred material is carbon formed by filtered cathodic arc (FCA) deposition. The mask layer 806 constructed of these materials provides several functions. First, it functions as a mill hard mask, and preferably has a milling resistance greater than the resist (discussed below). The mask layer 806 also functions as a CMP stop layer as described below.

A preferred mask layer 806 is a multilayer film. The preferred embodiment of the mask layer 806 is a bilayer of carbon and durimide, with the carbon layer being positioned closest to the pole tip layer. Both materials function as an ion mill mask, but carbon also functions as the CMP stop layer. Use of durimide in combination with carbon significantly increases the thickness of the mask layer, which enhances the milling resistance of the mask layer to pattern the pole tip layer 804.

A photoresist layer 808 is formed on the mask layer 806 and patterned using lithography to define a width of the write pole that will be formed from the write pole layer 804. Note that the width of the write pole should be a little wider than the final target width. This is because as the structure is ion milled to form the pole, the bevel is also formed. The beveling process will decrease the width of the pole.

A preferred resist is highly resistant to RIE chemistries to achieve higher selectivity to the mask layer 806. For example, the resist should be resistant toward oxygen (O2) or carbon-oxygen (CO2) RIE chemistries such as silicon-containing resist. It is desirable for the RIE chemistry to have higher selectivity to durimide and carbon compared to the resist. The resist is used to pattern durimide and carbon. One major reason to add durimide into the film stack is to provide more milling resistance when forming the pole. To reduce the overall thickness of the structure, it may be undesirable to deposit thicker carbon for increasing ion milling resistance, so durimide can be added. Durimide is very resistant to milling as well as easy to apply to the structure.

Figure 8B:
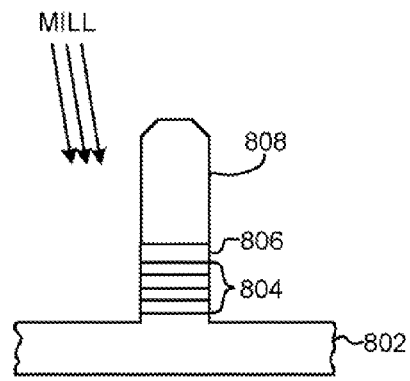

As shown in FIG. 8B, the mask layer 806 is etched by RIE to pattern the mask layer 806 to conform to the profile of the resist layer 808. The mask layer 806 now functions as a hard mask.

Figure 8C:
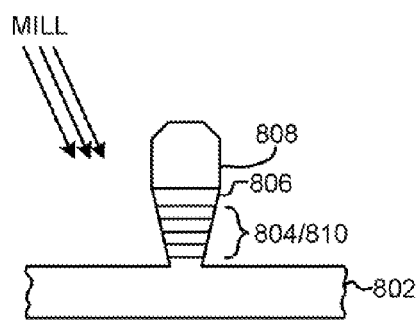

Milling is performed at high incidence to form straight edges in the pole tip layer 804. Then, as shown in FIG. 8C, the structure is milled at an angle to create the beveled shape of the pole tip 810, preferably at an angle of about 15% relative to the perpendicular. Fencing and redeposition can be removed by sweep milling at razing incidence.

Note that several alternative ion mill schemes may also be used, such as:

1. Thick alumina hard mask approach whereby the alumina hard mask is patterned with reactive ion etching (RIE) and BC13 chemistry. The hard mask is then used to create a 15 deg beveled write pole into the high moment material by ion milling.

2. Trim-notch-trim like approach whereby a NiFe hard mask is formed by through mask plating and used to pattern high moment material by ion milling.

The trim-notch milling process as discussed above will leave the hard mask intact after write pole fabrication by substituting hard mask with a non-magnetic material such as NiP, which is acceptable for a perpendicular single pole design.

Figure 8D:
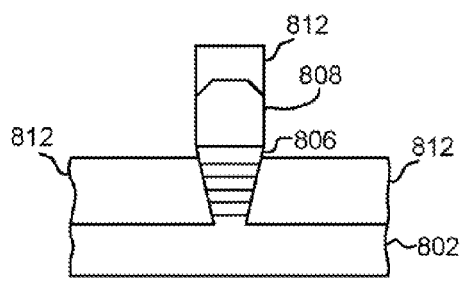

Now that the pole tip 810 has been formed, further processing is conducted to form a write gap of precise thickness. Referring to FIG. 8D, a layer of dielectric material 812 is deposited full film. A preferred dielectric material is alumina or some nonconductive metal. The dielectric material 812 is deposited to a level preferably abutting the mask layer 806. If the mask layer 806 is a two layer film of carbon and duramide, the dielectric material 812 is filled to the carbon layer that functions as the CMP stop layer.

Endpoint or deposition rate can be used to determine where to stop deposition. Note that the dielectric material 812 supports the pole tip 810 for further processing (e.g., polishing), and also protects the pole tip 810 from corrosion.

Figure 8E:
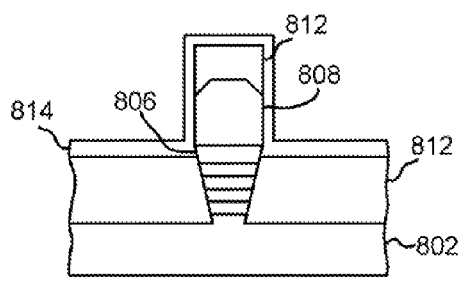

As shown in FIG. 8E, a stop layer 814 is deposited such that it matches up with the mask layer 806 on the pole tip 810. Preferred materials from which the stop layer 814 may be constructed are the same materials used to form the mask layer 806, though the materials of the stop and mask layers do not have to be the same in any particular implementation.

Figure 8F:
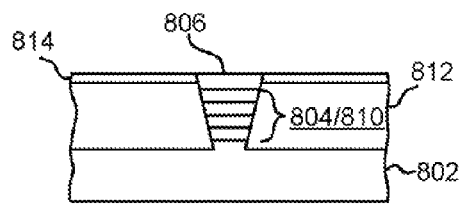

Referring to FIG. 8F, chemical mechanical polishing (CMP) is performed to planarize the structure. Preferably, a slurry is selected that is selective to alumina (the preferred dielectric material), i.e., that will polish alumina very easily but doesn't polish the mask and stop layer 814 material(s) as fast. The protruding portion of the structure is removed quickly, and polishing becomes slower when the mask and stop layers are reached. Thus, the mask layer 806 also functions as a CMP stop layer 814, reducing the chance of overpolishing unless that is desired. The CMP step also removes any redeposited material and fencing adhering to the structure.

Figure 8G:
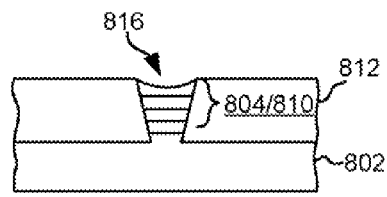

As shown in FIG. 8G, the mask and stop layers are preferably removed and dishing 816 formed in the pole tip 810. It has surprisingly been found that a little dishing into the pole straightens out the transition field. More particularly, the write field transition can be corrected by extending the CMP time to create dishing. Note FIG. 8J, which depicts a magnetic stimulation showing curved transitions 850 at the P3 width (PW3) of 120 nm. The extent of dishing also aids in creation of the gap thickness. Additional polishing can be performed to remove the mask and stop layers and create dishing 816 into the pole tip 810. The mask and stop layers can also be removed by RIE. The dishing 816 is preferably formed by sputter etching, as alumina is resistant to sputter etching and therefore will not be significantly altered.

Figure 8H:
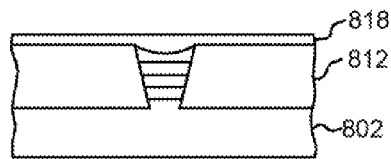

Now, because the pole tip 810 is exposed, it is possible to precisely control the thickness of the gap layer by simply depositing a gap layer 818 to the desired thickness as shown in FIG. 8H. The gap layer 818 between the pole tip 810 and trailing shield must be nonmagnetic e.g., of alumina or some metal such as Rh, Ru, etc. Rh and Ru are preferred because they are very conductive, and the oxide of Ru is electrically conductive so it can be plated on. If a metal gap is implemented it can be used to plate up the trailing shield aspect of the head design, such as shield 820 of FIG. 9. This method eliminates the problems found in prior art processes, namely that of redeposited material forming on top of the pole tip 810, which affected the thickness of the write gap. Thus, the gap layer is left intact and provides a planar surface upon which to fabricate the trailing shield and back gap.

Figure 8I:
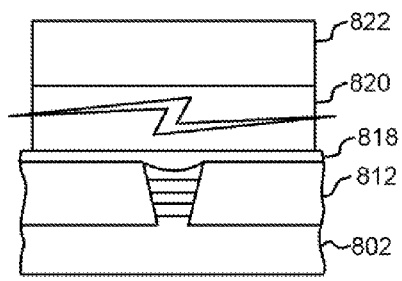
Figure 8J:
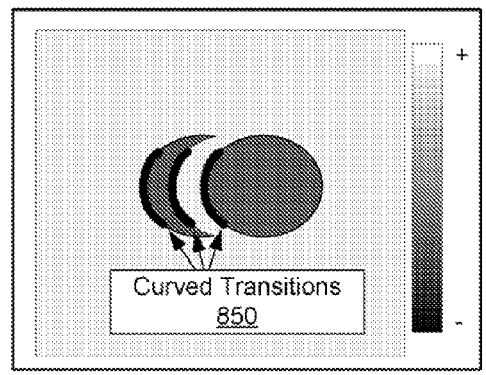
FIG. 8J illustrates a micromagnetic simulation showing curved transitions at the P3.

As depicted in FIG. 8I, a trailing shield 820 is formed above the gap layer 818. The trailing shield 820 is preferably constructed of a soft magnetic material, and should have a high magnetic moment. A preferred material for the trailing shield 820 is NiFe, CoFe, CoNiFe, and alloys thereof. A coil structure and insulation (not shown) are also formed. Finally, a return pole 822 is formed. Methods for forming the trailing shield 820, coils, and return pole 822 are described below.

Figure 9:
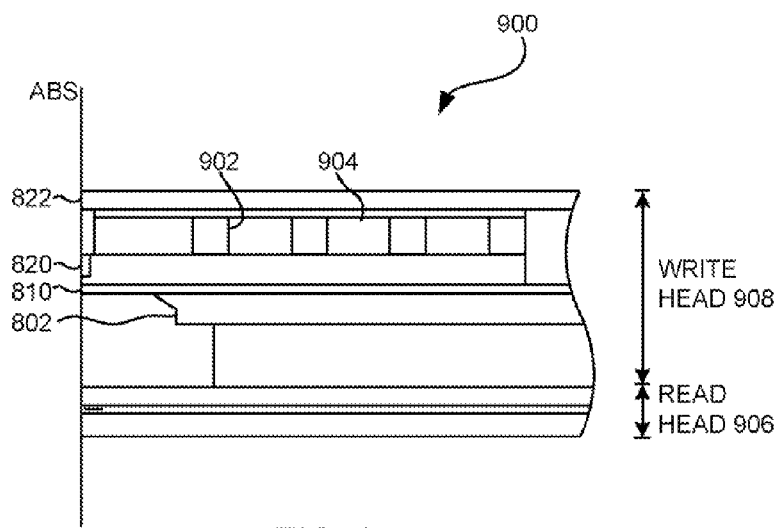
FIG. 9 is a cross-sectional view of a typical head, not to scale, formed according to the process described in FIGS. 8A-8I.

FIG. 9 illustrates a typical head 900 in which the trailing shield write pole formed according to the process described above may be implemented. Also shown are coils 902 and insulation 904, and a read head 906 that may be formed above or below the write head 908.

Figure 10:
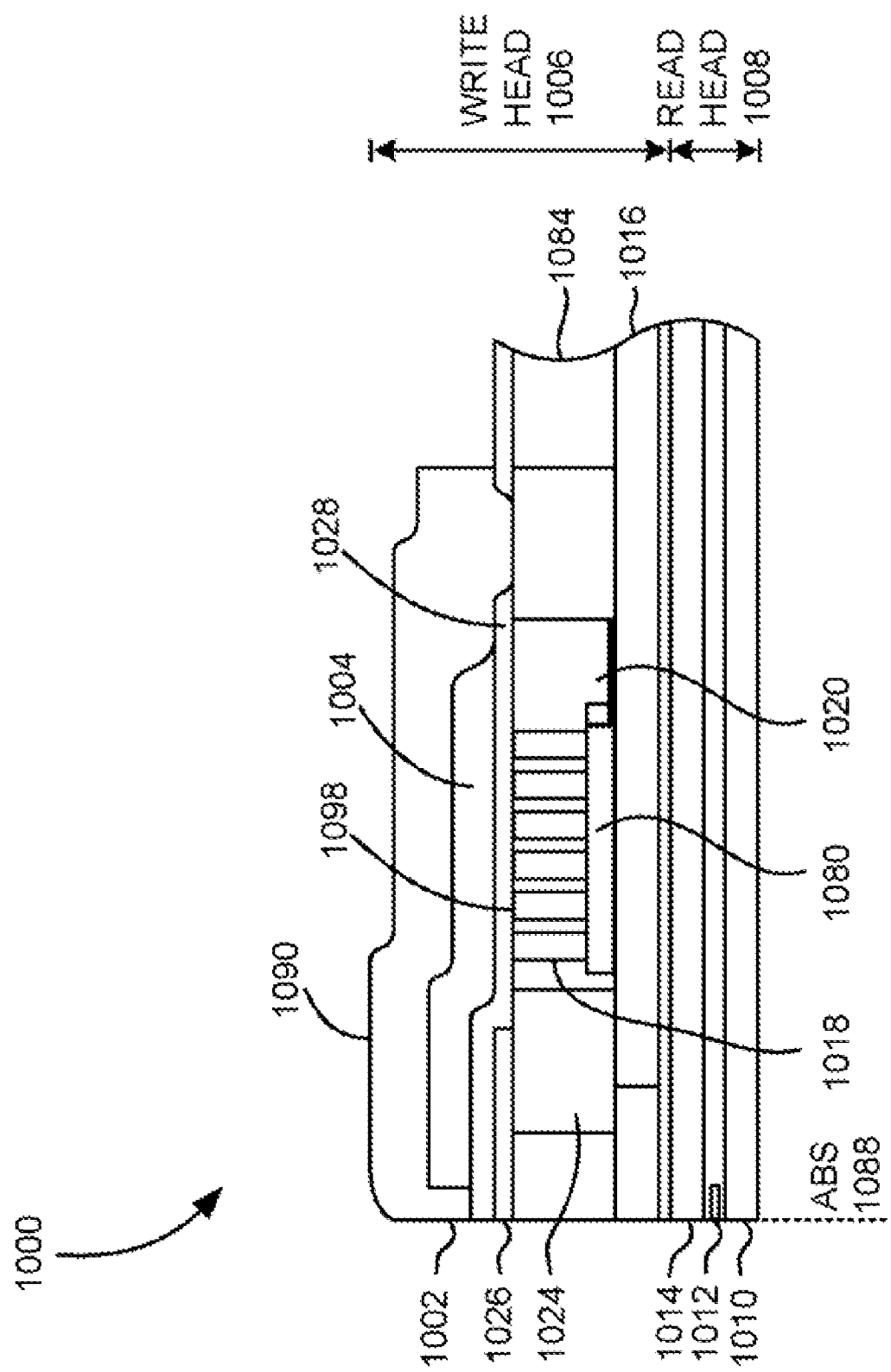
FIG. 10 is a side cross sectional view of a perpendicular read/write head structure, not to scale, according to one embodiment of the present invention.

FIG. 10 illustrates a perpendicular read/write head structure 1000 having a trailing shield 1002 according to another embodiment. Methods for forming the trailing shield will be discussed subsequently.

As shown in FIG. 10, a residual masking structure 1004 can be created and left in the head 1000 to allow for the formation of the trailing shield and for the subsequent fabarication steps to build the remainder of the write head 1006. Note that it is desirable to leave the masking structure 1004 in the head 1000 to protect the write gap and pole tip, to protect them from subsequent processing (e.g copper coils).

In this embodiment, a read head 1008 is formed first. The read head includes a first shield layer 1010, a sensor 1012, and a second shield layer 1014. A pole 1016 is formed above the first shield layer 1010. A coil structure 1018 and insulation layers 1020, 1080 are formed above the first pole layer 1016. A flux shaping layer 1024 is formed above the pole layer 1016. A probe pole tip 1026 is formed above the flux shapinig layer 1024 and extends to the air bearing surface (ABS) 1088 of the head 1000. The shaping layer 1024 magnetically connects the magnetic flux from the back gap 1084 to the pole tip 1026. The probe pole tip 1026 directs the flux into the media to perform the write function. The flux returns through the media to the return pole 1090. The pole tip 1026 is preferably a ferromagnetic structure with a high magnetostriction typically CoFe, NiFe, or laminated layers (CoFe, nonmagnetic layer, CoFe, nonmagnetic layer, etc.)

A nonmagnetic gap layer 1028 is formed above the probe pole tip 1026. Exemplary materials for the gap layer 1028 are alumina or a nonmagnetic metal such as Rh, Ru, etc. As a note, there is a need for an insulator above the coil 1018 at the top surface 1098 to electrically isolate the coil from the ferromagnetic pole layers. A masking structure 1004 of conventional materials such as photoresist (oxide, nitride, silanated resist etc.) is formed above the gap layer 1028. The trailing shield 1002 is formed above the gap layer 1028 and the masking structure 1004. The trailing shield 1002 is preferably constructed of a soft magnetic material, and should have a high magnetic moment. A preferred material for the trailing shield 1002 is NiFe and alloys thereof.

The throat height of the trailing shield 1002 is defined between the masking structure 1004 and the ABS. The trailing shield 1002 should have a throat height that is much less than the distance from the shaping layer 1024 to the ABS end of the pole tip 1026. Preferably, the throat height of the trailing shield 1002 is less than about 100% and more preferably, less than about 60% of the distance from the shaping layer 1024 to the ABS ends of the pole tip 1026.

Also, the thickness of the gap layer 1028 between the pole tip 1026 and the trailing shield 1002 is preferably roughly equal to the distance from the pole tip 1026 to the soft underlayer of the media, through a ratio of the gap layer 1028 to the distance from the pole tip 1026 to the soft underlayer of the media can be in the range of about 1:2 to about 2:1. An illustrative thickness of the gap layer 1028 can be about 35 nm or less, but will scale with the dimensions of the pole tip 1026, the dimensions being the track width and thickness of probe pole tip 1026. Preferably, the thickness of the gap layer 1028 will be less than about 50 nm for a track width on the order of about 0.1 microns or less.

One advantage provided by the trailing shield 1002 is that because the bits in the media are written on the trailing edge of the pole tip 1026, the trailing shield 1002 bends the magnetic flux lines. More particularly, the magnetic field that comes out of the probe pole tip 1026 enters the media at an off-normal angle, which may help write more stable bits in the media.

Figure 11:
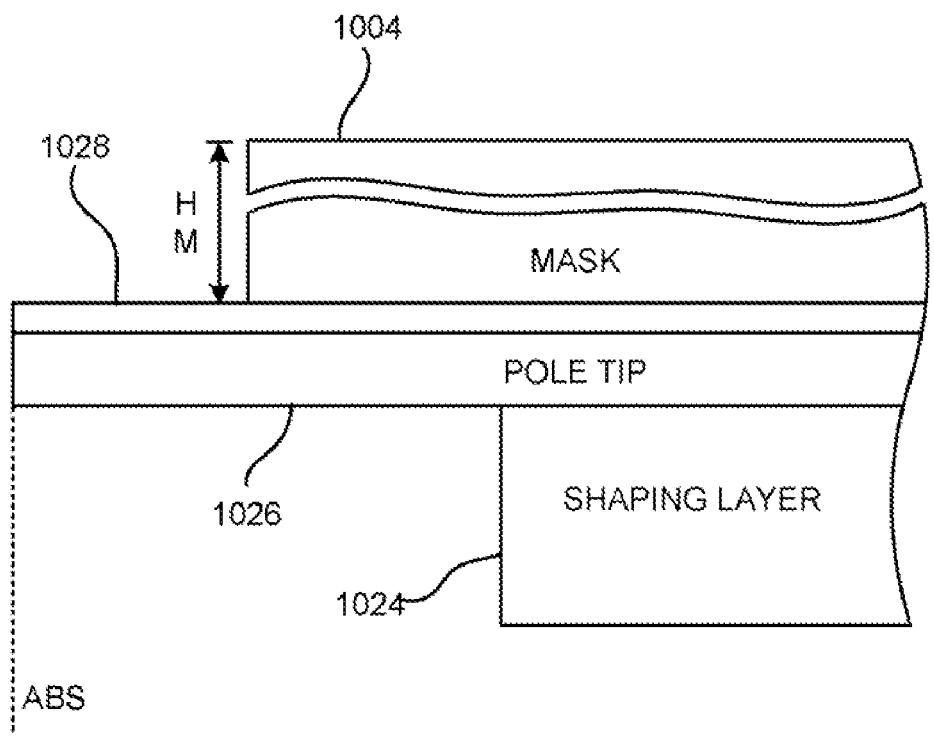
FIG. 11 is a partial side view of a perpendicular write head pole tip region, not to scale, during fabrication of a write head.

An outline of a perpendicular write head pole tip 1026 region is shown in FIG. 11 where the separation of the trailing shield 1002 and the pole tip 1026 is a gap of non-magnetic material. In order to form the trailing shield 1002, a masking structure is formed above the write gap 1028. The height of masking structure (HM) is preferably substantially greater than the distance from the shaping layer 1024 to the ABS. For instance, the height can be greater than about 125% the distance from the shaping layer 1024 to the ABS. The reason for the tall height of the masking structure 1004 is to prevent leakage of the flux into the trailing shield 1002 before it reaches the ABS. A preferred height of the masking structure 1004 is about 0.5 microns or more.

The masking structure 1004 is preferably formed of a material that can remain in the head, such as an oxide nitride, silanated resist (Si-containing resist) such as HSQ (hydrosilsesquioxide), etc. The mask is patterned and possibly shaped via reactive ion etching (RIE).

Figure 12:
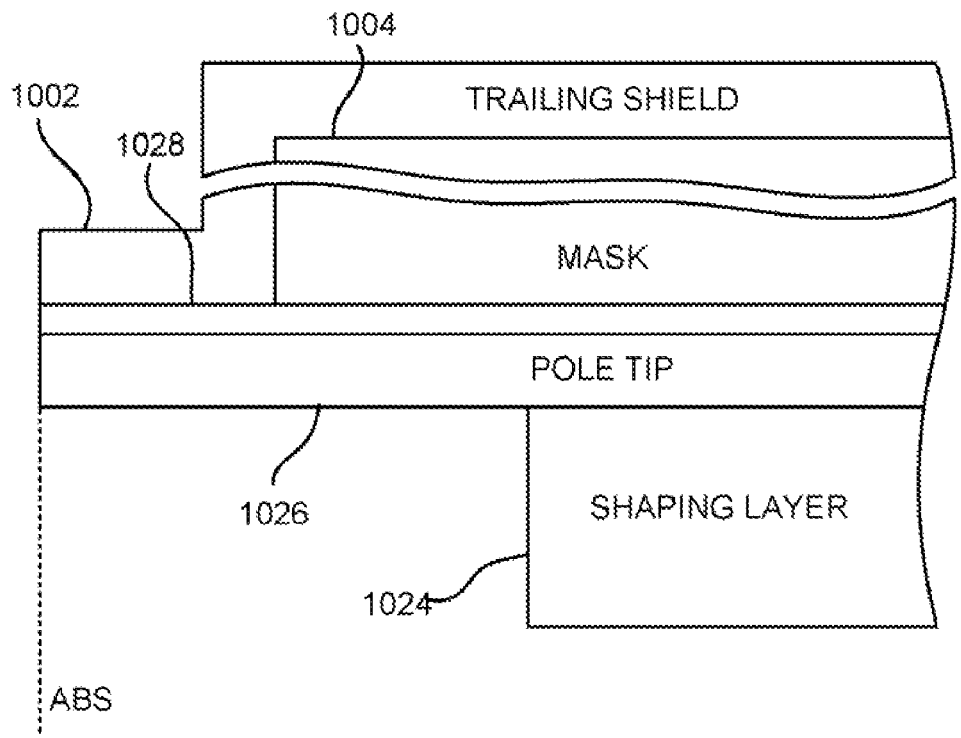
FIG. 12 is a partial side view of the perpendicular write head pole tip region of FIG. 11 upon addition of a trailing shield by deposition.

As shown in FIG. 12, the trailing shield 1002 of NiFe other ferromagnetic material is deposited over and/or around the mask. For instance, if the trailing shield 1002 is a sputter deposited magnetic material, the trailing shield 1002 will encapsulate the masking structure 1004.

Figure 13:
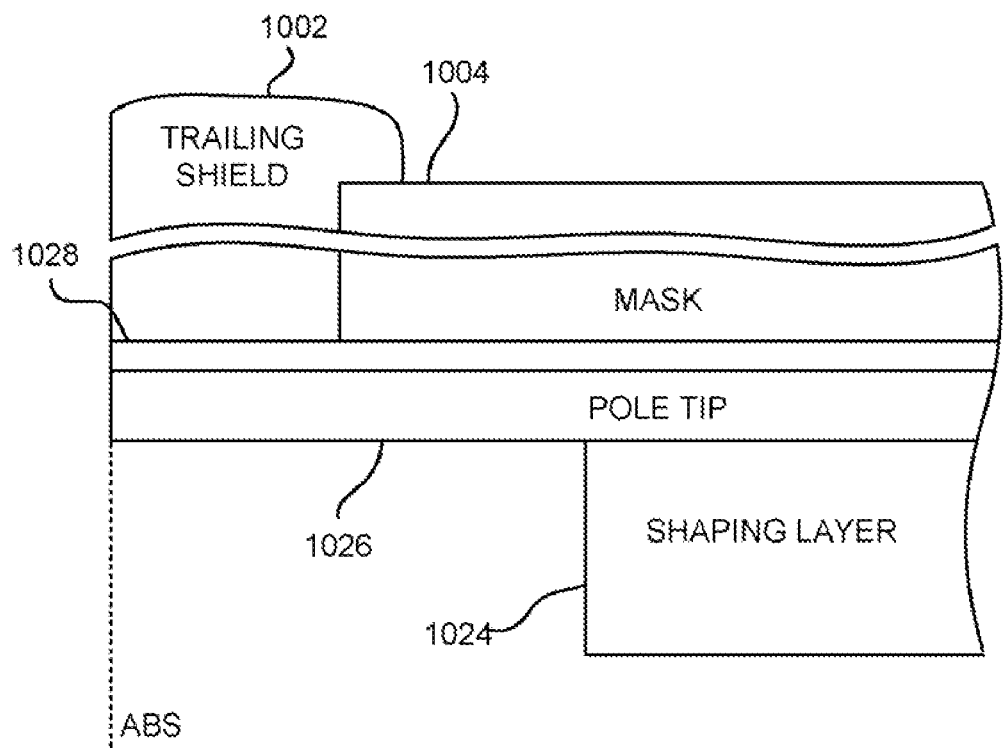
FIG. 13 is a partial side view of the perpendicular write head pole tip region of FIG. 11 upon addition of a trailing shield by plating.
Figure 14:
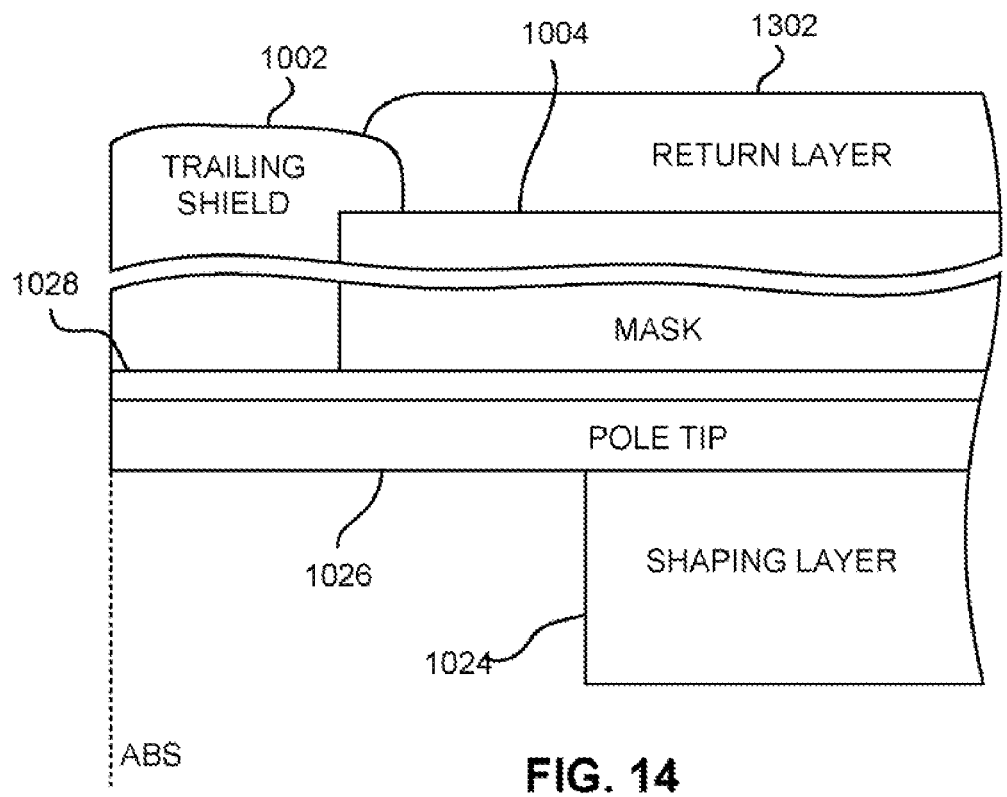
FIG. 14 is a partial side view of the perpendicular write head pole tip region of FIG. 13 upon addition of a return layer.

FIGS. 13-14 depict a method of forming a trailing shield 1002 by plating. As mentioned above, the gap layer 1028 between the pole tip 1026 and trailing shield 1002 must be nonmagnetic e.g., of alumina or some metal such as Rh, Ru, etc. Rh and Ru are preferred because they are very conductive, and the oxide of Ru is electrically conductive so it can be plated on.

Again, a masking structure 1004 is formed, preferably of a material that can remain in the head. See FIG. 12. The structure is then placed in a plating solution and the trailing shield 1002 is formed by plating, resulting in the structure shown in FIG. 13. The trailing shield 1002 may be overplated, such that it "mushrooms" over the edge of the masking structure 1004. While the trailing shield 1002 can be allowed to float, it is preferable to ferromagnetically connect the plated trailing shield 1002 structure to the rest of the head. As shown in FIG. 14, the trailing shield 1002 is stitched to the head by a photolithographic lift off or, as shown, forming a return layer 1302 by plating more NiFe to the plated structure. The return layer 1302 extends back to the return pole 1016. Note that the location and shape of the return layer 1302 can vary, but it is preferably stitched to the return pole 1016.

There has thus been described a novel head structure and methods for forming the same. One advantage provided by the present invention includes allowing trailing shield edge definition to be defined with a thin resist process. Another advantage is that the edge of shield thickness is determined by the thickness of the transfer material. Yet another advantage is that the processes disclosed herein allow a thin trailing shield 1002 to be fabricated without damaging the pole tip 1026. A further advantage is that the masking material is not present at the ABS surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming a write head having an air bearing surface (ABS), comprising:
    forming a mask layer above a pole tip layer;
    forming a layer of resist above the mask layer;
    patterning the resist, the patterned resist defining about a maximum width of a pole tip in a direction parallel to the ABS of the head;
    removing portions of the mask layer not covered by the patterned resist;
    shaping a pole tip from the pole tip layer;
    depositing a layer of dielectric material above the pole tip, wherein the layer of dielectric material extends about adjacent to the mask layer;
    depositing a stop layer over the dielectric material, the stop layer abutting the mask layer; and
    polishing to remove the resist layer, the dielectric layer formed above the resist layer and a portion of the stop layer for forming a substantially co-planar upper surface of the mask layer and the stop layer.

2. The method as recited in claim 1, wherein the pole tip layer is laminated.

3. The method as recited in claim 1, wherein the mask layer is formed of a material selected from a group consisting of carbon, a silicon nitrate, a tantalum oxide, a silicon oxide, and durimide.

4. The method as recited in claim 1, wherein the mask layer is formed of a material selected from a group consisting of $Si_3N_4$, $Ta_2O_5$, $SiO_2$, and durimide.

5. The method as recited in claim 1, wherein the mask layer is formed of carbon formed by filtered cathodic arc (FCA) deposition.

6. The method as recited in claim 1, wherein the mask layer is a multilayer structure.

7. The method as recited in claim 6, wherein the mask layer comprises at least one layer of carbon and at least one layer of durimide.

8. The method as recited in claim 1, wherein the pole tip layer is shaped to taper together towards the shaping layer along a plane perpendicular to the ABS.

9. The method as recited in claim 1, further comprising removing the mask layer prior to forming the gap layer, and forming dishing in the pole tip.

10. The method as recited in claim 9, wherein the dishing is formed by etching.

11. The method as recited in claim 1, wherein the head is a perpendicular head.

* * * * *